United States Patent [19]

Schöndorfer et al.

[11] Patent Number: 4,586,823
[45] Date of Patent: May 6, 1986

[54] DEVICE FOR MIXING AND APPLYING WET CONCRETE

[76] Inventors: Georg Schöndorfer, Nonner Strasse 2, 8230 Bad Reichenhall, Fed. Rep. of Germany; Johann Fleischer, Sachsenheim 41, A-5020 Elixhausen, Austria; Manfred Stocker, Adolf-Kolping-Siedlung 30, Wiesbachstr. 2; Günther Körber, both of 8898 Schrobenhausen, Fed. Rep. of Germany

[21] Appl. No.: 601,748

[22] Filed: Apr. 20, 1984

Related U.S. Application Data

[63] Continuation of Ser. No. 379,776, May 18, 1982.

[30] Foreign Application Priority Data

May 19, 1981 [DE] Fed. Rep. of Germany ....... 3119811

[51] Int. Cl.$^4$ .............................. B28C 5/14; B28C 5/46
[52] U.S. Cl. ........................................... 366/3; 366/10; 366/64; 366/325
[58] Field of Search ...................... 366/3, 5, 10, 11, 13, 366/16, 27, 30, 34, 37, 40, 42, 52, 64, 67, 152, 177, 191, 194, 195, 196, 244, 249, 251, 254, 285, 309, 312, 325

[56] References Cited

U.S. PATENT DOCUMENTS

| | | | |
|---|---|---|---|
| 1,124 | 5/1864 | Potter | 366/27 |
| 1,297,081 | 3/1919 | Brown | 366/3 |
| 1,969,533 | 8/1934 | Pipes | 366/16 |
| 2,661,194 | 12/1953 | Katovsick | 366/11 |
| 2,698,742 | 1/1955 | McCoy | 366/67 |
| 2,861,786 | 11/1958 | Madsen | 366/30 |
| 3,459,408 | 8/1969 | Boushka | 366/312 |
| 3,843,100 | 10/1974 | Haas | 366/177 |
| 4,281,934 | 8/1981 | Krause | 366/30 |

FOREIGN PATENT DOCUMENTS 2425532 11/1975 Fed. Rep. of Germany ...... 366/191

*Primary Examiner*—Robert W. Jenkins
*Attorney, Agent, or Firm*—Fleit, Jacobson, Cohn & Price

[57] ABSTRACT

A method and device for preparing a wet concrete mix. An elongated tubular swirl chamber has a generally cylindrical shaped interior. A shaft extends axially in the chamber and is adapted for rotation at about 100 r.p.m. or higher. The chamber contains an inlet end for the introduction of dry particles pneumatically carried by a pressurized gas and an outlet end. Blades are arranged in several rows circumscribing the shaft so that the blades overlap to form a helical spiral to aid in moving the particles through the chamber. The blades in the helical spiral form a turbulent swirling distribution of particles traveling through the chamber when the shaft is rotated at 100 r.p.m. or higher and simultaneously the particles are forced by the pressurized gas through the chamber. A liquid is injected into the turbulent swirling distribution so as to wet the particles. The wetted particles are ejected out of the outlet by the force of the pressurized gas and at the same time the blades in the helical spiral are rotating to form the turbulent swirling distribution.

14 Claims, 1 Drawing Figure

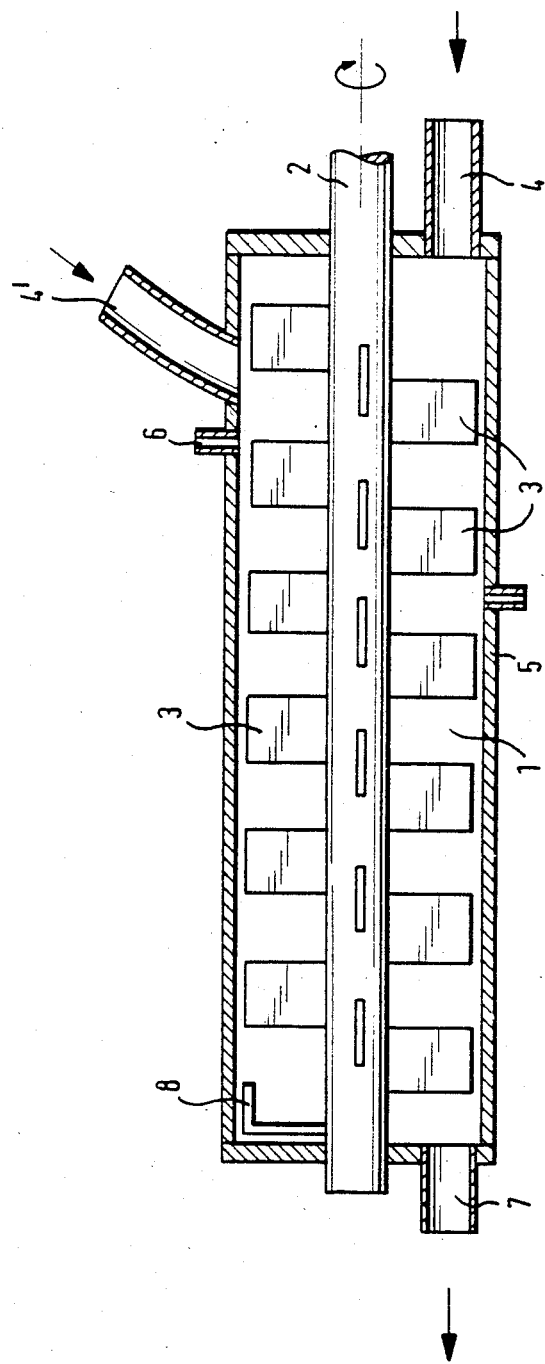

DEVICE FOR MIXING AND APPLYING WET CONCRETE

This application is a continuation of application Ser. No. 379,776 filed May 18, 1982.

The invention relates to a device for mixing and spraying wet concrete, especially in underground cavity structures. The device consists of a device for metering and pneumatically transporting dry mix such as cement, sand, gravel and dust- or fiber-like additives, from which the dry mix is fed to a swirl chamber; a swirl chamber in which the dry mix is mixed with liquids; and a wet-spraying nozzle.

Devices for spraying wet concrete are known, in which the water is fed to the dry mix directly at the spraying nozzle. Such devices have the disadvantage that the dry mix is wetted only incompletely. This makes the quality of the wet concrete frequently inhomogeneous. In addition, much dust is developed which can lead to health damage such as silicosis, especially in underground cavities.

From Offenlegungsschrift No. 29 47 913, a device is further known, in which the dry mix is mixed with water in a kneading worm, to which wet concrete is fed via a densifier screw to a nozzle which leads into a ring nozzle and from which the wet concrete is fed to the spraying nozzle by means of compressed air. This device has the disadvantage that because of the not absolutely uniform transport of the wet concrete from the densification screw, the compressed air fed-in via the ring nozzle backs up and penetrates into the kneading worm. This prevents a uniform transport of the wet concrete. A further disadvantage is due to the fact that through the backup of compressed air fed from the ring nozzle, pressure equalization of the compressed air fed from the ring nozzle with the compressed air in the kneading worm takes place, by which the dry mix is fed to the kneading worm. Thereby, a complete stoppage of the transport can occur. It is a further disadvantage that material in fiber form, particularly steel fibers, are subjected in the kneading worm to heavy mechanical stress and thereby, their effectiveness for the wet concrete is reduced. It is an object of the invention to develop a device for mixing and spraying wet concrete in underground cavities, by which the shortcomings of the known devices are overcome.

The invention consists of a device in which a high-speed shaft which is provided with overlapping vanes arranged in a helical spiral is arranged in a swirl chamber and in which, in the vicinity of the one end, an inlet for the pneumatically transported dry mix is provided. Over the cylinder surface of the swirl chamber, inlets for feeding-in water and liquid aggregates or aggregates in dust or fiber form and additives are provided. On the side of the swirl chamber facing away from the inlet, an outlet for the mixed wet concrete material is provided.

The shaft of the swirl chamber is preferably driven at 100 to 4000 RPM in order to obtain the most intensive turbulence possible and a cement glue formation as uniform as possible.

It may be of advantage to make the shaft a hollow shaft, to add to the mixture optionally further additives even if only intermittently.

It is advantageous to arrange the vanes movably on the shaft, so that, depending on the application, the pneumatic mix transport and the intensity of the mixing can be influenced.

The swirl chamber is preferably cylindrical so as to favor by means of the vanes the mechanical self-cleaning effect of the swirl chamber.

If the design of the swirl chamber is cylindrical, it is advantageous to arrange the inlet for the dry mix in the one and the outlet for the wet concrete material in the other end face of the swirl chamber. Preferably, the inlet and the outlet are provided opposite each other in the lower or upper region of the end faces. However, it may also be advantageous to arrange the inlet and the outlet offset in the regions.

For certain mixtures it is of advantage to break through the end wall on the outlet side with a large area, for instance, to make the end wall as a spoke wheel, in the hub of which the shaft is supported, and the end of which extends into an adjoining funnel, the end of which leads into the hose to the spraying nozzle.

It may also be of advantage to dispense with the end face on the outlet side and to let the cylinder surface merge into a cone. In this case, the shaft of the swirl chamber is supported overhung in the end wall on the inlet side.

To prevent clogging in the funnel and to ensure continuous mechanical cleaning of the funnel, one or several conical cleaning blades are preferably arranged on the shaft end.

On the shaft of the swirl chamber, several rows of blades are preferably arranged which are offset relative to each other to define a helical spiral. This allows improved turbulence of the mix. If the swirl chamber is cylindrical, the diameter of the cylinder circumscribed by the rotating blades preferably corresponds almost to the inside diameter of the swirl chamber. This prevents the development of undesirable deposition spaces, which is essential in view of the very fast setting of wet concrete material. It is difficult to remove deposited and set concrete from the swirl chamber later. For this reason it is also advantageous to provide, in the design of the cylindrical swirl chamber, with a closed end face on the outlet side, one or several cleaning blades.

It is also possible to design the swirl chamber as a cone tapered toward the outlet, where the shaft is supported either overhung in the end face on the inlet side or in the end face and in the hub of a spoke wheel arranged in the lower portion of the funnel.

The device according to the invention, has, in each of its embodiments, the advantage over the known, so-called dry cement spraying devices, that the spraying nozzle may simply be the end of the hose which leads away from the swirl chamber and is easy to handle due to its small weigth. Furthermore, the wetting of the dry mix is removed from the influence of the nozzle operator, which results in a uniform quality of the concrete. It is a further advantage that immediately at the working site which in the case of tunnel construction, is usually very cramped, the work is not hindered by bulky equipment.

For further explanation, reference is made to an embodiment example of the device according to the invention which is shown in the attached drawing.

The device consists of a swirl chamber 1, the shell 5 of which is cylindrical. In the end faces of the swirl chamber 1, a shaft 2 is supported in bearings centrically, on which several rows of staggered vanes 3 and, at the end face on the outlet side, a cleaning blade 8 are arranged. In inlet 4 and an outlet 7 are arranged in the lower portion of the end faces. In this embodiment, a further inlet 4' is provided in the vicinity of the end face on the inlet side on the cylinder surface 5. Finally, several inlets 6 for feeding-in water and liquid additives or additives in dust or fiber form are arranged on the cylinder shell 5.

To prepare the wet concrete, the dry mix which is premixed in a metering and conveyer device of known type, is pneumatically fed into the swirl chamber 1 via a hose. The dry mix is mechanically stirred in the swirl chamber 1 by the vanes 3 and is wetted by the water via the inlets 6 and other liquids. At the same time, the mixed material is transported by the air stream which comes from the metering and conveyer device, is passed-on pneumatically through the swirl chamber 1 and through the outlet 7 to the spraying nozzle.

We claim:

1. A device for preparing a wet concrete mix, said device comprising:

an elongated tubular swirl chamber having a generally cylindrically shaped interior;

an inlet end at one end of said chamber, said inlet end adapted for the introduction to the chamber of dry particles pneumatically carried by pressurized gas;

an outlet end at the other end of said chamber;

a shaft extending axially in said chamber and adapted for rotation at about 100 RPM or higher;

means for rotating said shaft at about 100 RPM or higher;

blades secured to and extending radially of said shaft, said blades arranged in several rows circumscribing said shaft, the blades in each succeeding row being offset, spaced from and partially overlapping the blades of preceding and succeeding rows, said blades overlapping to form a helical spiral to aid in moving said particles through said chamber, the diameter of the cylinder circumscribed by said rotating blades generally corresponding to the inside diameter of said swirl chamber;

said blades in said helical spiral forming a turbulent swirling distribution of the particles traveling through the chamber when said shaft is rotated at 100 RPM or higher and simultaneously the particles are forced by the pressurized gas through the chamber; and means for injecting a liquid into the turbulent swirling distribution so as to wet the particles, said wetted particles being ejected out of said outlet by the force of said pressurized gas introduced through said inlet at the same time that said blades in said helical spiral are rotating to form said turbulent swirling distribution.

2. The device of claim 1 in which the blades are substantially flat and face substantially in the rotating direction of the shaft and have tops close to but spaced from the inside of the swirl chamber.

3. The device of claim 1 in which said means is in the form of at least one liquid inlet in the side of the chamber and closer to the inlet than to the outlet.

4. The device of claim 1 in which at the end of the chamber having the outlet the shaft has a radially extending cleaning blade which rotates over that end when the shaft is rotated.

5. The device of claim 1 in which the inlet and outlet are offset from the shaft.

6. The device according to claim 1, wherein said shaft is adapted to rotate from about 100 to about 400 RPM.

7. The device according to claim 1, further comprising means for movably adjusting the positions of said blades relative to said shaft.

8. The device according to claim 1, wherein said elongated swirl chamber terminates at each end in an end face and said inlet for the dry mix is arranged in one end face and said outlet for the wet concrete material in the other end face of said swirl chamber.

9. The device according to claim 8, wherein said inlet and said outlet are arranged in the end faces of said swirl chamber opposite each other.

10. A method for preparing a wet concrete mix, said method comprising the steps of:

providing an elongated tubular swirl chamber having a generally cylindrically shaped interior;

pneumatically carrying dry particles by pressurized gas into the chamber through an inlet provided in the chamber;

rotating an axially extending shaft in said chamber at about 100 RPM or higher;

providing blades secured to and extending radially of said shaft;

arranging the blades in several rows circumscribing the shaft, the blades in each succeeding row being offset, spaced from and partially overlapping the blades of the preceding and succeeding row;

selecting the blades so that the diameter of the cylinder circumscribed by the rotating blades generally corresponds to the inside diameter of the swirl chamber;

the rotation of the axially extending shaft and its rows of blades forming a turbulent swirling distribution of the particles traveling through the chamber when the shaft is rotated at 100 RPM or higher;

forcing the particles through the chamber by the pressurized gas at the same time that the blades are rotating to form said turbulent swirling distribution;

injecting a liquid into the turbulent swirling distribution so as to wet the particles; and ejecting the wetted particles out of an outlet end of the swirl chamber by the force of the pressurized gas introduced through the inlet.

11. The method of claim 10 in which the blades are substantially flat and face substantially in the rotating direction of the shaft and have tops close to but spaced from the inside of the swirl chamber.

12. The method according to claim 10, wherein said shaft is rotated from about 100 to about 400 RPM.

13. The method according to claim 10, wherein said elongated swirl chamber terminates at each end in an end face and said inlet for the dry mix is arranged in one end face and said outlet for the wet concrete material in the other end face of said swirl chamber.

14. The method according to claim 13, wherein said inlet and said outlet are arranged in the end faces of said swirl chamber opposite each other.

* * * * *